(12) United States Patent
Sitnikau (10) Patent No.: US 8,998,715 B2
(45) Date of Patent: Apr. 7, 2015

(54) CONTROL OF VEHICLES IN THREE DIMENSIONAL VIRTUAL ENVIRONMENTS

(71) Applicant: Wargaming.net LLP, Walthamstow (GB)

(72) Inventor: Anton Sitnikau, Minsk (BY)

(73) Assignee: Wargaming.net LLP, London (GB)

( * ) Notice: Subject to any disclaimer, the term of this patent is extended or adjusted under 35 U.S.C. 154(b) by 0 days.

(21) Appl. No.: 14/251,251

(22) Filed: Apr. 11, 2014

(65) Prior Publication Data

US 2014/0221061 A1    Aug. 7, 2014

Related U.S. Application Data

(63) Continuation of application No. 13/943,885, filed on Jul. 17, 2013, now Pat. No. 8,734,251, which is a continuation of application No. 13/768,420, filed on Feb. 15, 2013, now Pat. No. 8,734,250, which is a continuation-in-part of application No. 13/645,882, filed on Oct. 5, 2012, now Pat. No. 8,641,526.

(51) Int. Cl.
*A63F 9/24* (2006.01)
*A63F 13/40* (2014.01)
*G09B 9/02* (2006.01)
*A63F 13/30* (2014.01)
*A63F 13/803* (2014.01)
*A63F 13/5252* (2014.01)
*A63F 13/5258* (2014.01)

(52) U.S. Cl.
CPC . *A63F 13/10* (2013.01); *G09B 9/02* (2013.01); *A63F 13/12* (2013.01); *A63F 9/24* (2013.01); *A63F 13/803* (2014.09); *A63F 13/5252* (2014.09); *A63F 13/5258* (2014.09); *A63F 2300/303* (2013.01); *A63F 2300/8017* (2013.01)

(58) Field of Classification Search
USPC .......................................................... 463/31
See application file for complete search history.

(56) References Cited

U.S. PATENT DOCUMENTS

| 6,234,901 | B1 * | 5/2001 | Nagoshi et al. ................. 463/33 |
| 6,670,957 | B2 * | 12/2003 | Fukuda .......................... 345/473 |
| 6,718,058 | B2 * | 4/2004 | Ochi et al. ..................... 382/154 |
| 8,535,154 | B2 | 9/2013 | Minato et al. |
| 2007/0270215 | A1 | 11/2007 | Miyamoto et al. |
| 2008/0070684 | A1 | 3/2008 | Haigh-Hutchinson |

(Continued)

OTHER PUBLICATIONS

Dec. 5, 2014 Final Office Action issued in U.S. Appl. No. 13/768,420.

(Continued)

*Primary Examiner* — Reginald Renwick
(74) *Attorney, Agent, or Firm* — Banner & Witcoff, Ltd.

(57) ABSTRACT

Methods and systems for controlling vehicles within graphically simulated environments are described herein. A video game such as a vehicle-based combat game may have vehicles (such as airplanes) operating in a simulated three dimensional space. In a destination based control mode, users may partially control vehicles using two-dimensional input devices by inputting a new destination for the vehicle to go to, and the game's control logic may then automatically calculate how to control the vehicle toward the new heading. Fight and assault (bombing) control sub-modes may be provided. In addition, in an immediate control mode, a user may provide input that indicates a direction and speed of rotation, to provide more direct control of a vehicles control systems and/or control surfaces.

21 Claims, 10 Drawing Sheets

(56) References Cited

U.S. PATENT DOCUMENTS

| | | |
|---|---|---|
| 2009/0094502 A1 | 4/2009 | Park et al. |
| 2010/0035906 A1 | 2/2010 | Flamme et al. |
| 2010/0048271 A1 | 2/2010 | Champagne et al. |

OTHER PUBLICATIONS

Apr. 12, 2013 Office Action issued in U.S. Appl. No. 13/645,882.
Jun. 20, 2013 Office Action issued in U.S. Appl. No. 13/645,882.
Google Maps, "Introducing Smart Navigation in Street View: double-click to go (anywhere!)," http://google-latlong.blogspot.com/2009/06/introducing-smart-navigation-in-street.html, Jun. 4, 2009.
Star Fox 64 (HQ)—Mission 1: Corneria, http://www.youtube.com/watch?v=jDU4WzM3NsM, Created Oct. 9, 2008.
Star Fox 64 (HQ)—Mission 2: Meteo, http://www.youtube.com/watch?v=jM7217EWti4, Created Apr. 21, 2009.
Jul. 10, 2013 Non-Final Office Action issued in U.S. Appl. No. 13/768,420.
Nov. 22, 2013 Non-Final Office Action issued in U.S. Appl. No. 13/943,885.
Feb. 20, 2014 Notice of Allowance issued in U.S. Appl. No. 13/943,885.

\* cited by examiner

CONTROL OF VEHICLES IN THREE DIMENSIONAL VIRTUAL ENVIRONMENTS

CROSS REFERENCE TO RELATED APPLICATIONS

This application is a continuation of copending application Ser. No. 13/943,885, filed Jul. 17, 2013, entitled "Multimodal Control of Vehicles in Three Dimensional Space," which is a continuation of application Ser. No. 13/768,420, filed Feb. 15, 2013, entitled "Control of Vehicles in Three Dimensional Space," which is a continuation-in-part of U.S. Pat. No. 8,641,526, issued Feb. 4, 2014, entitled "Using Input from a Mouse Device to Control a Video Game Vehicle," each of which is herein incorporated by reference in its entirety for all purposes.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to computers and vehicle simulation software. More specifically, the invention provides methods, systems, and techniques for controlling vehicles rendered in a graphically rendered environment and controllable in multiple dimensions.

BACKGROUND OF THE INVENTION

Video games are increasingly popular. Online multiplayer video games have become particularly popular due, at least in part, to the ability of players to compete with multiple other human players.

Popular genres of multiplayer games include the first-person-shooter (FPS) and the third-person shooter genres. In FPS games, the player's on-screen view simulates the view of the character or vehicle controlled by the player; that is, the first-person view. The object of many FPS games is to accomplish a goal within a game. Common goals include killing other game characters that represent other players, capturing flags that represent opponents' territory, assaulting another team's base, and the like. Third person shooter games often have similar goals but differ in the perspective of the player. In third person shooters, the player views the game world from above or behind the character or vehicle controlled by the player.

Because online multiplayer games have become increasingly common, there is substantial competition between the offered games regarding obtaining and retaining consumers. Repetitive play can often lead to players becoming bored with a particular game. In addition, games simulating control of vehicles in three dimensions, such as flight simulators, can be difficult for novice users. Simpler control techniques are needed to entice novice players to play games and simulations where the user has control of a vehicle in three or more dimensions.

BRIEF SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, the present invention is directed to methods, systems, apparatus, and computer readable media storing software instructions to perform graphically rendering a virtual environment using a physics engine; simulating a vehicle within the virtual environment using the physics engine; while maintaining the vehicle in a first directional heading, receiving user input identifying a second directional heading; pivoting a camera angle about the vehicle to the second directional heading; causing the vehicle to alter course from the first directional heading to the second directional heading; and maintaining the camera angle at the second directional heading while graphically rendering rotation of the vehicle as the vehicle alters course to the second directional heading.

Some aspects may cause the vehicle to alter course by determining one or more inputs to apply to one or more corresponding control systems of the vehicle to yield the desired second directional heading; applying the determined one or more inputs to the one or more corresponding control systems; and using the physics engine to determine a resultant effect of the inputs on each corresponding control system.

In some aspects, the one or more control systems may include flaps, ailerons, and/or an engine of the vehicle as simulated in the virtual environment using the physics engine.

Some aspect may provide a first vehicular control sub-mode, wherein a default camera angle of the first vehicular control sub-mode provides a view from behind and above the vehicle being controlled, and wherein the first vehicular control sub-mode provides a first targeting reticle associated with a first weapon attached to the vehicle. Some aspects may include a second vehicular control sub-mode, wherein a default camera angle of the second vehicular control sub-mode provides a view from behind and below the vehicle being controlled, and wherein the second vehicular control sub-mode provides the first targeting reticle associated with the first weapon attached to the vehicle, and concurrently provides a second targeting reticle associated with a second weapon attached to the vehicle.

In some embodiments the vehicle is an airplane, the first weapon is an air-to-air weapon, and the second weapon is an air-to-ground weapon.

In some aspects, when in the second vehicular sub-mode, the system may maintain a target window on a ground-based target after deployment by the vehicle of an air-to-ground weapon until the air-to-ground weapon hits the target or the ground in the virtual environment.

These and other aspects will be readily apparent upon reading the detailed description below.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Aspects described herein are directed to the control of vehicles in three-dimensional space, for example, controlling a vehicle in a graphically rendered environment, e.g., a video game, wherein the environment attempts to replicate or simulate real world physics. Illustrative embodiments include video games, serious games, massive multiplayer online games, virtual reality, 3D based education, computer based training, and the like, where a user controls a vehicle in multiple dimensions. The vehicle may be any vehicle that moves within the simulated 3D environment, e.g., an airplane, helicopter, glider, drone, warship, boat, submarine, tank, jeep, car, truck, rocket, missile, space shuttle, space ship, and the like.

Figure 1:
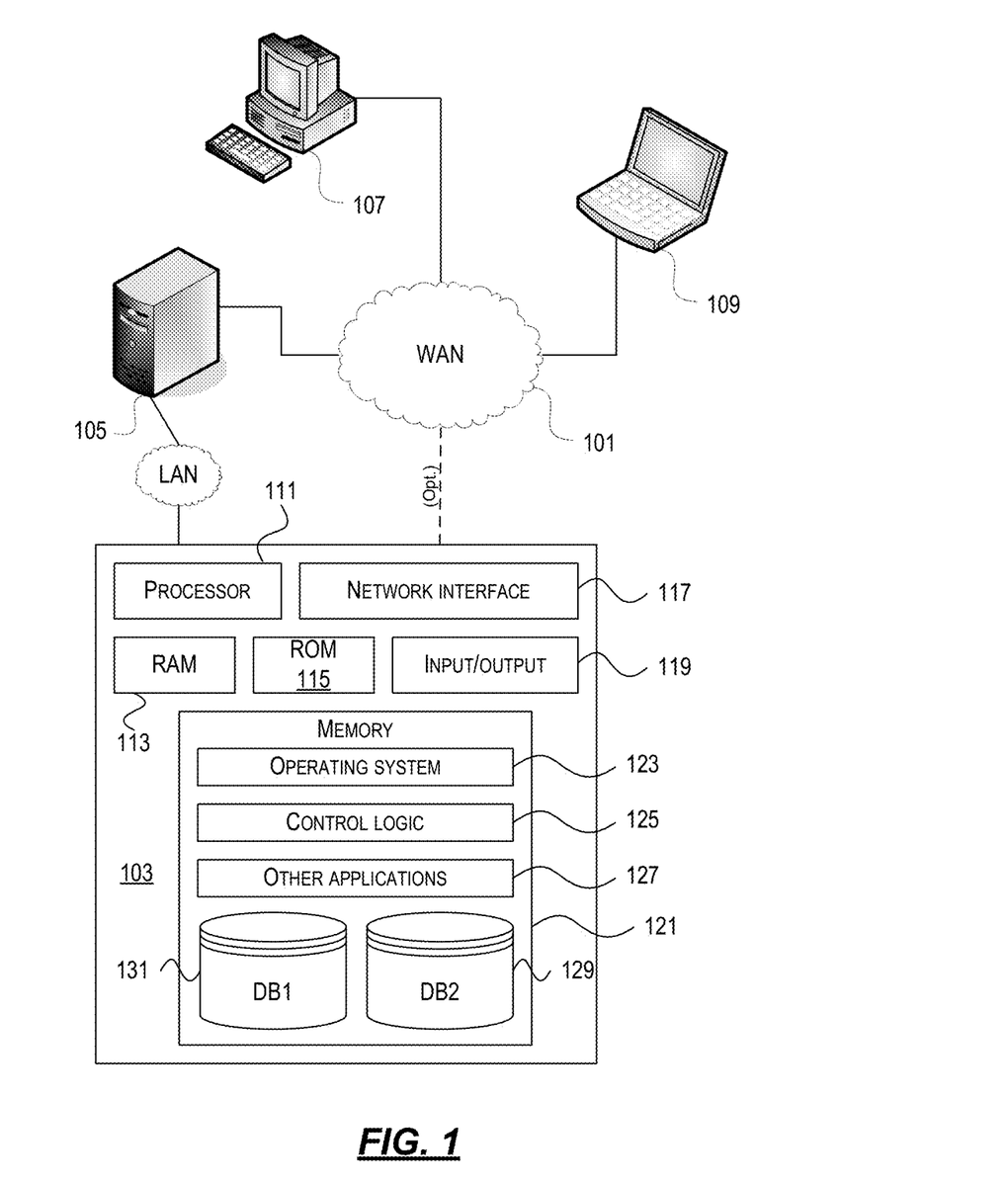
FIG. 1 illustrates a network architecture and data processing architecture that may be used to implement on or more aspects described herein.

FIG. 1 illustrates one example of a network architecture and data processing device that may be used to implement one or more illustrative aspects of the invention. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 may provide overall access, control and administration of databases and control software for performing one or more illustrative aspects of the invention as described herein, e.g., acting as a game server. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a client software application (e.g., game client software) that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the invention as described herein, and other application software 127 providing secondary, support, and/or other functionality which may or may not be used in conjunction with aspects of the present invention. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects of the invention may be embodied in computer-usable or readable data and/or computer-executable instructions (e.g., control logic 125), such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 2:
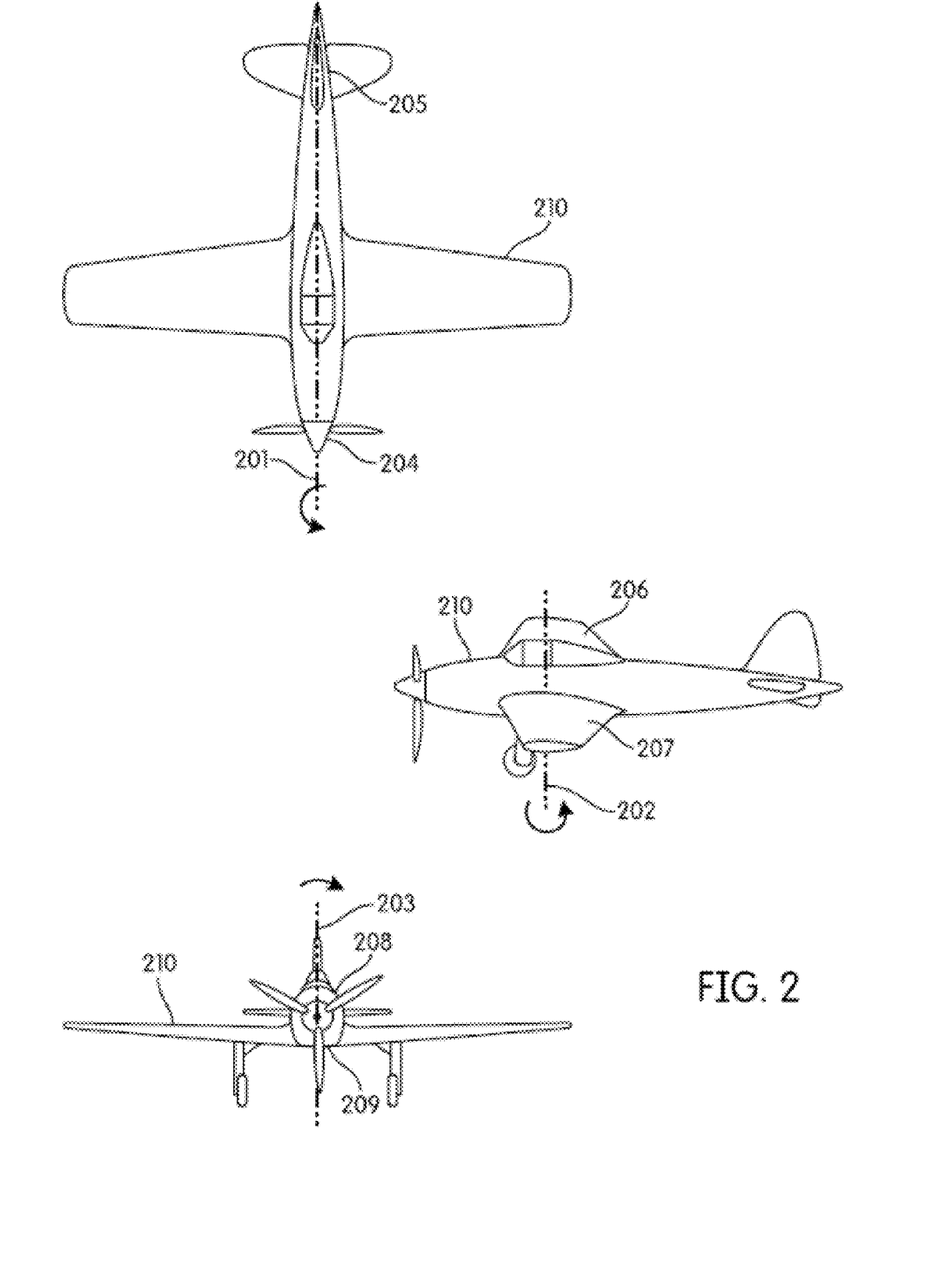
FIG. 2 illustrates control planes of an aircraft.

With reference to FIG. 2, according to an illustrative aspect, a vehicle within a graphically simulated 3D environment may be an airplane 210, which is controlled by a user participating in the graphically simulated 3D environment. The use of an airplane is for illustrative purposes only, and is not meant to be limiting. FIG. 2 illustrates the conventional axes of rotation of airplane 210. Rotation along axis 201, which intersects the vehicle 210 through its nose 204 and tail 205 substantially parallel to the ground, is conventionally called "roll." Rotation along axis 202, which intersects the vehicle 210 laterally and substantially parallel to wings 206 and 207, is conventionally called "pitch." Rotation along axis 203, which intersects the top 208 and bottom 209 of the vehicle 210 substantially perpendicular to the ground is conventionally called "yaw." Flight dynamics is the science of air vehicle orientation and control in these three dimensions.

Actual and/or simulated control systems may be used to control a vehicle's orientation (attitude) about its center of mass. The control systems may include actuators, which exert forces in various directions, and generate rotational forces or moments about the center of gravity of the aircraft, and thus rotate the aircraft in pitch, roll, or yaw. For example, a pitching moment is a vertical force applied at a distance forward or aft from the center of gravity of the aircraft, causing the aircraft to pitch up or down. Other control systems and/or surfaces may be used, based on the type of vehicle.

Roll, pitch and yaw refer, in this context, to rotations about the respective axes starting from a defined equilibrium state. The equilibrium roll angle is known as wings level or zero bank angle, equivalent to a level heeling angle on a ship. Yaw is known as "heading". The equilibrium pitch angle in submarine and airship parlance is known as "trim", but in aircraft, this usually refers to angle of attack, rather than orientation. However, common usage ignores this distinction between equilibrium and dynamic cases.

A fixed-wing aircraft increases or decreases the lift generated by the wings when it pitches nose up or down by increasing or decreasing the angle of attack (AOA). The roll angle is also known as bank angle on a fixed wing aircraft, which usually "banks" to change the horizontal direction of flight. An aircraft is usually streamlined from nose to tail to reduce drag making it typically advantageous to keep the sideslip angle near zero, though there are instances when an aircraft may be deliberately "sideslipped" for example a slip in a fixed wing aircraft.

According to some aspects, a user may control airplane 210 using a two-dimensional user input device such as a mouse. Because a mouse only provides input in two-dimensional space, and the graphically rendered simulated environment includes three dimensions, input from the mouse may be converted to three-dimensional commands as further described herein. In such an embodiment, control input may be provided to the control logic software by movement of the mouse. For example, when viewing an airplane from behind, if a user wants the airplane to pursue a course toward an object currently off the left side of the vehicle and at a lower altitude than the vehicle (from the viewpoint of the user), the user may drag the mouse diagonally to the left and toward the user's body (resulting in a cursor moving down and town the left on a display screen) to indicate that the user is attempting to bank the vehicle left through a combination of roll and yaw, as well as pitch the vehicle's nose below the horizon.

However, despite the three dimensions of the graphically simulated virtual environment, in the preceding example the user only provided two dimensions of input using the mouse. According to some aspects described herein, control of a vehicle may be based on an assumption that the vehicle (e.g., airplane) is constantly in forward motion in accordance with its user-directed heading, based on present yaw, pitch, and roll. Forward motion may be maintained with constant thrust and/or speed, until altered separately by the user, or as needed by control logic 125 in order to perform a requested maneuver. Thus, separate controls may be used (e.g., by the control logic or on the keyboard) to control speed, whereas the mouse may be used for directional control of the vehicle. Yaw, pitch, and roll rotations of the vehicle may be automatically generated based on the 2-dimensional input received from the mouse.

According to aspects described herein, multiple control modes may be used to control a vehicle in a graphically simulated virtual environment or world. A first control mode may be referred to as destination-based control. The particular names used are immaterial compared to the functionality that each mode exhibit, as further described below.

Figure 3:
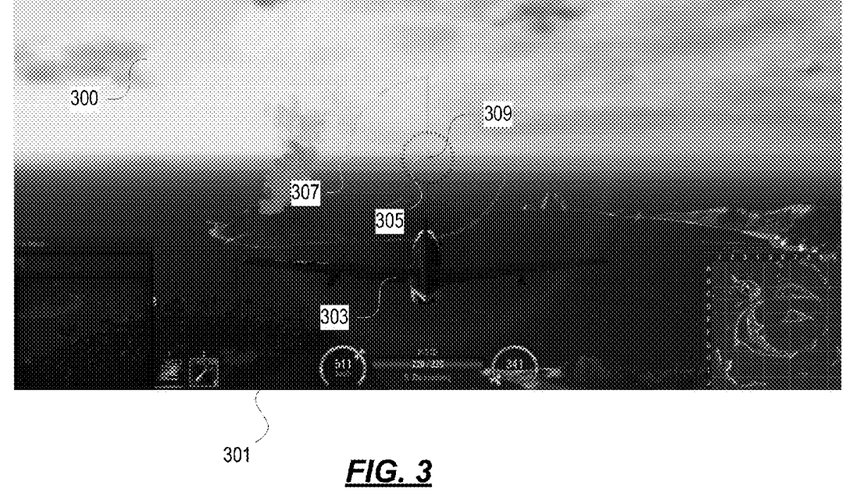
FIG. 3 illustrates a screenshot of a video game in accordance with one or more illustrative aspects described herein.

FIG. 3 illustrates a screenshot 301 of a user's view of a graphically simulated virtual environment 300 according to an aspect described herein, utilizing destination based control. Screenshot 301 may correspond to the massive multiplayer online (MMO) flight combat game WORLD OF WARPLANES® by Wargaming.net. Virtual environment 300 may be rendered by control logic 125 to simulated real-world physics as various vehicles navigate environment 300. Real world physics may be applied based on control surfaces of each vehicle.

Screenshot 301 illustrates a user view as generated for output on a display screen. The user may be in control of airplane 303, which by default is flying straight and level. Reticle 305 (also referred to as crosshairs 305) indicates a current direction or heading of airplane 303. Reticle 305 depicts an instantaneously current heading/direction of flight, and does not represent a direction/heading of a final destination selected or aimed at by the user. Rather, reticle 305 indicates the direction a gun mounted on airplane 301 would fire at that instant in time. Thus, if the user has an enemy lined up in reticle/crosshairs 305 when the user provides input to the system indicating a desire to fire the airplane's guns, the gunfire will likely hit the enemy. Also shown in FIG. 3 is destination indictor 307. Destination indicator is controllable by the user, e.g., using a two dimensional input device such as a mouse. Destination indicator 307 is usable by the user to indicate a heading desired to be flown by airplane 301. When flying straight, both reticle 305 and indicator 307 may be aligned, e.g., as shown in FIG. 3, where both are aligned on heading 309.

Each vehicle may be equipped with multiple weapons with which a user can attack other vehicles, enemies, outposts, defenses, etc. For example, an aircraft may be equipped with machine guns, guns, cannons, lasers, ray guns, radar jammers, missiles, bombs, torpedoes, or any combination of these and/or other weapons. Each aircraft may be equipped with one or more air-to-air weapons (e.g., machine guns, missiles, etc.), and/or one or more air-to-ground weapons (e.g., bombs, missiles, torpedoes, etc.). Air-to-air weapons may be associated with a separate targeting reticle than air-to-ground weapons. Mixed use weapons, e.g., missiles that may be fired at an air or ground target, may be associated with the same targeting reticle as is used for machine guns. That is, each weapon that is fired substantially parallel to the vehicle's current direction of travel may be associated with a first targeting reticle, and each weapon that is fired substantially perpendicular to the vehicle's direction of travel may be associated with a second targeting reticle.

Figure 4:
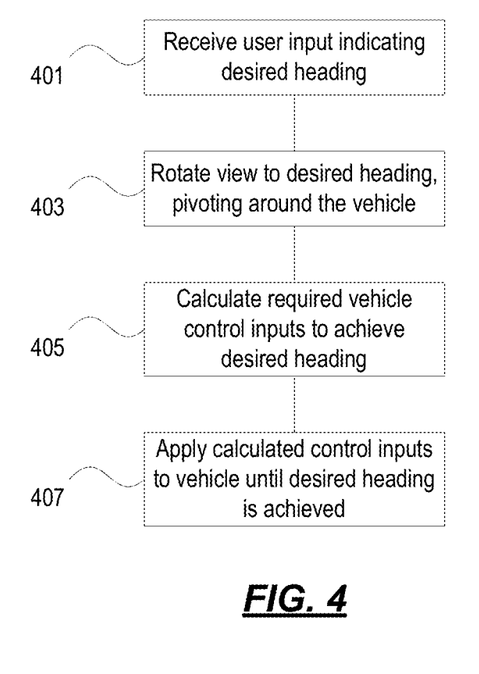
FIG. 4 illustrates a flowchart for a method of controlling a vehicle in three dimensions in accordance with one or more illustrative aspects described herein.
Figure 5:
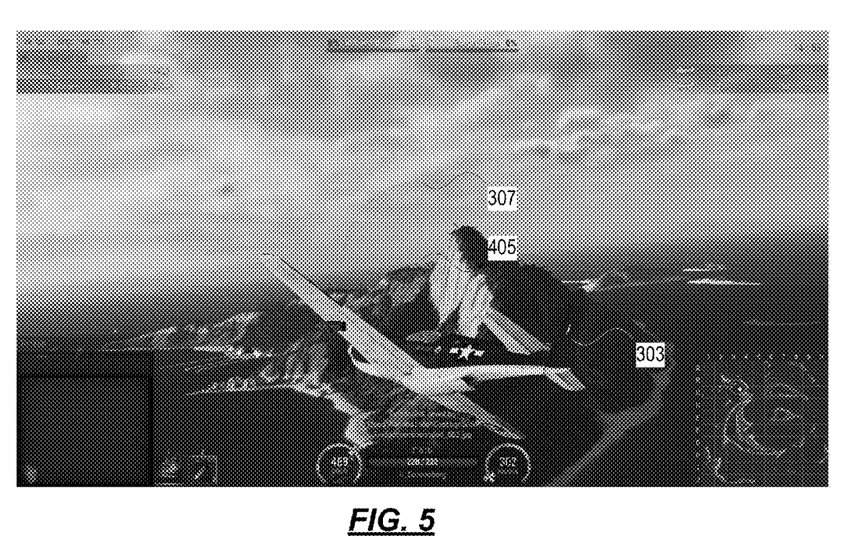
FIGS. 5-19 illustrate screenshots of a video game in accordance with one or more illustrative aspects described herein.

With further reference to FIG. 4 and FIGS. 5-9, when in destination-based control mode, in step 401 a user initially provides input indicating a desired heading for vehicle 303. The input may be provided via a two dimensional input device such as a mouse. For example, with reference to FIG. 3, the user indicates a desire to steer airplane 303 away from heading 309 and to the right by moving the mouse directionally to the right, resulting in the view depicted in FIG. 5. As shown in FIG. 5, the user has provided input to move destination indicator 307 to indicate a new heading 405.

In step 403, which is performed as closely as possible in synchronicity with step 401 to give the user real-time visual feedback, control logic 125 pivots the rendered view about vehicle 303 to be directionally pointing to heading 405 indicated by destination indicator 307, as shown in FIG. 5. Next in step 405, control logic 125 calculates the required inputs on and/or changes to one or more control systems and/or control surfaces of vehicle 303 (e.g., engine, flaps, ailerons, etc.) in order to steer airplane 303 to heading 405 indicated by destination indicator 307. Next, in step 407, control logic 125 applies the calculated inputs on vehicle 303 to alter the vehicle's heading (as indicted by reticle 305) to match the heading indicated by indicator 307.

Figure 6:
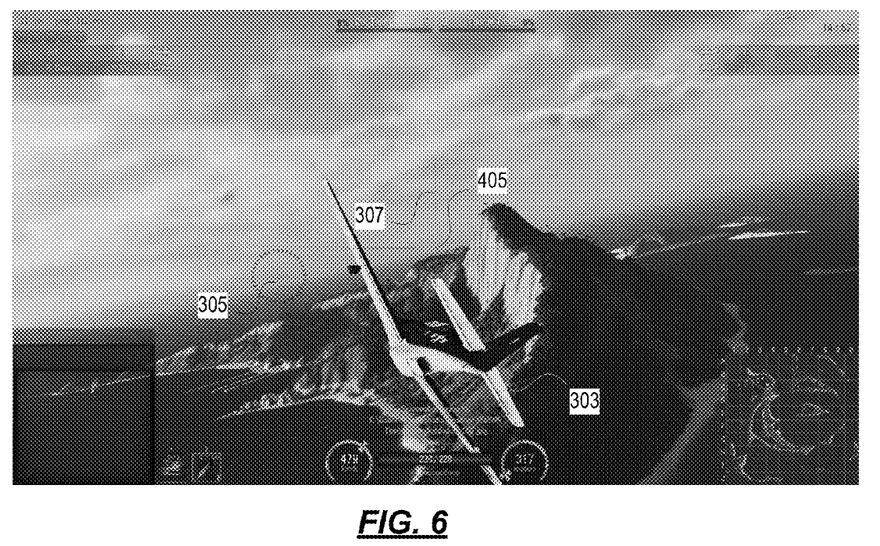

During step 407 control logic 125 may cause the visual display of the virtual environment 300 to maintain a visual perspective toward user desired heading 405, thereby causing airplane 303 to appear to rotate towards heading 405, as depicted sequentially in FIGS. 6-9. FIG. 6 illustrates a view shortly after the user provides input indicating heading 405, e.g., after control logic 125 has started applying inputs on control systems of airplane 303, as is evident by reticle 305 coming into view from the left. Also shown in FIG. 6, airplane 303 has banked hard to the right to accomplish the turn desired by the user.

Figure 7:
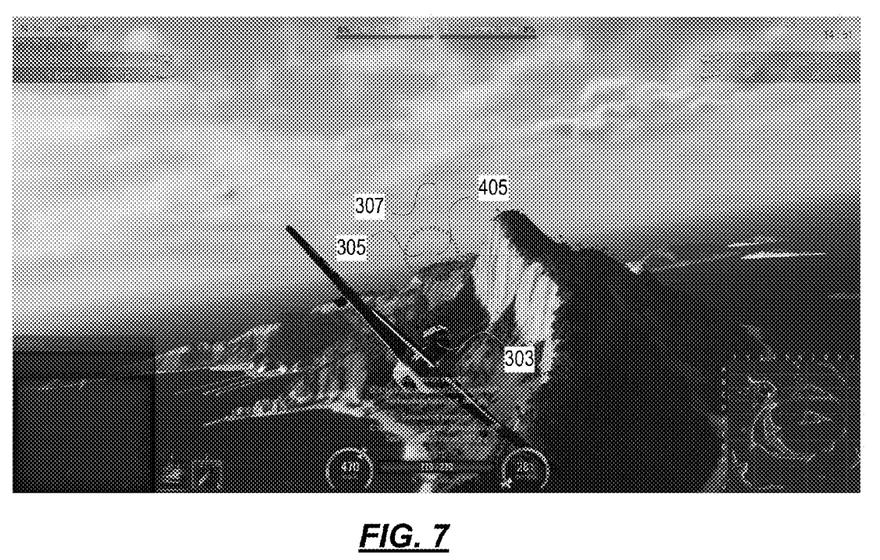
Figure 8:
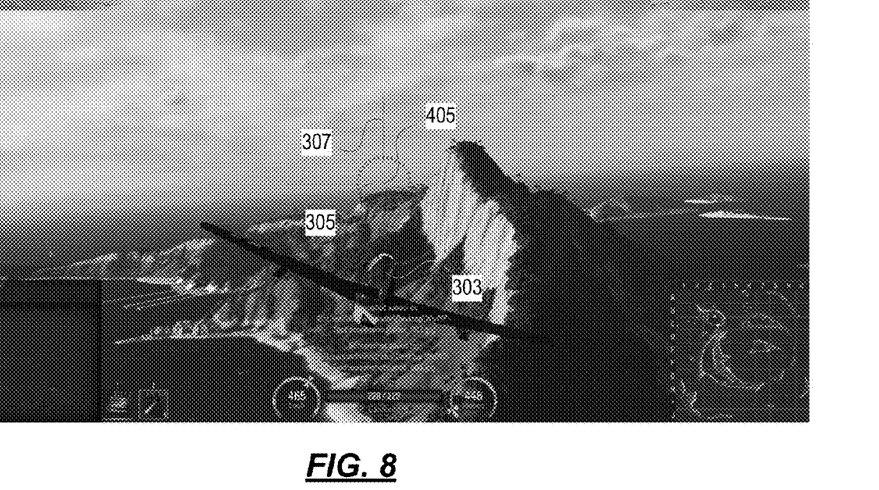
Figure 9:
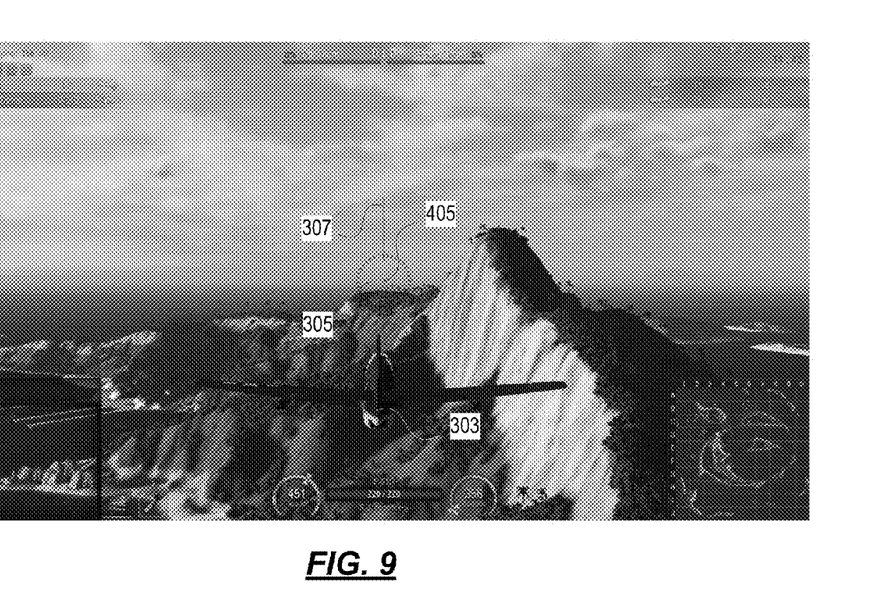

FIG. 7 illustrates a view as reticle 305, indicating a then current heading of airplane 303, has almost reached the user indicated new heading 405. FIG. 8 illustrates a view as reticle 305 (indicating the current heading of airplane 303) has reached new heading 405. At this point, control logic 125 has begun apply inputs to airplane 303 to begin leveling off. FIG. 9 illustrates a view where airplane 303 has returned to straight flight in the direction indicated by heading 405, and control logic 125 has stopped applying inputs to control systems of airplane 303 which would cause airplane 303 to further change course or direction.

The method depicted in FIG. 4 and as shown in FIGS. 3 and 5-9 may be altered based on different implementations. For example, in a video game that does not model real-world physics and/or that does not model control systems (including control surfaces) of vehicles, the control logic may simply render the vehicle rotating toward the desired new heading without regard to inputs to control systems, control surfaces, and/or real-world physics. That is, control logic 125 may render airplane 303 as shown in FIGS. 3 and 5-9, but without applying inputs to any control systems of airplane 303 (or any other vehicle being simulated).

Using destination based control as described above, a video game, serious game, virtual reality, or other simulation software may provide an intuitive control mechanic for controlling vehicles in three dimensions using only a two dimensional input device. The user participating in the game or simulation has good visibility based on third-person perspective from behind the vehicle (or based on the requested heading), can easily control a vehicle with one handed control using a mouse, and has dynamic three-dimensional response of the aircraft based on real-world laws of physics. A user can thus concentrate on an objective provided within the software (e.g., attacking an enemy, or navigating to predetermined point or in a predetermined path) without necessarily knowing what control inputs needs to be provided.

Using destination-based control, the destination indicator 307 floats on screen and moves in response to mouse input. When the user moves direction indicator 307, in-game camera rotation is based on a new point identified by direction indicator 307 as a destination for a vehicle to travel to or toward. Control logic 125 may automatically calculate optimal yaw, pitch, and/or roll, as needed, for the vehicle. Once the new heading is achieved, the vehicle may return to a straight (and optionally, level) path.

Destination-based control may be used in accordance with multiple sub-modes of vehicle control. The above-described destination based control is in accordance with a fight sub-mode, where the in-game camera view of airplane 303 is from behind the vehicle. Fight sub-mode may be particularly useful, e.g., when attacking other air-based targets in a dogfight or similar combat experience. According to some aspects, an assault sub-mode may be selected by the user for use in situations where the user may be attacking a target from above, e.g., bombing a ground-based target, and/or flying in a nosedive or contour flying.

Each sub-mode may be associated with predefined restrictions for all dimensions of movement (e.g., within the three planes of yaw, pitch, and roll) to prevent the vehicle from performing maneuvers that may be fatal for the aircraft. For example, in assault sub-mode the user may be prohibited from performing advanced maneuvers such as a loop or barrel roll. The restrictions may be set so that a particular aircraft or all aircraft do not exceed a maximum angles in each plane of movement (e.g., max 45 degree roll in either direction, max climbing angle of 30°, and max dive angle of 40°). If the user provides input indicating a desire to maneuver the aircraft beyond those angles, the angle may be reduced to the max allowed angle. The control logic may control the vehicle to maintain a constant height, when possible, for player convenience.

Figure 10:
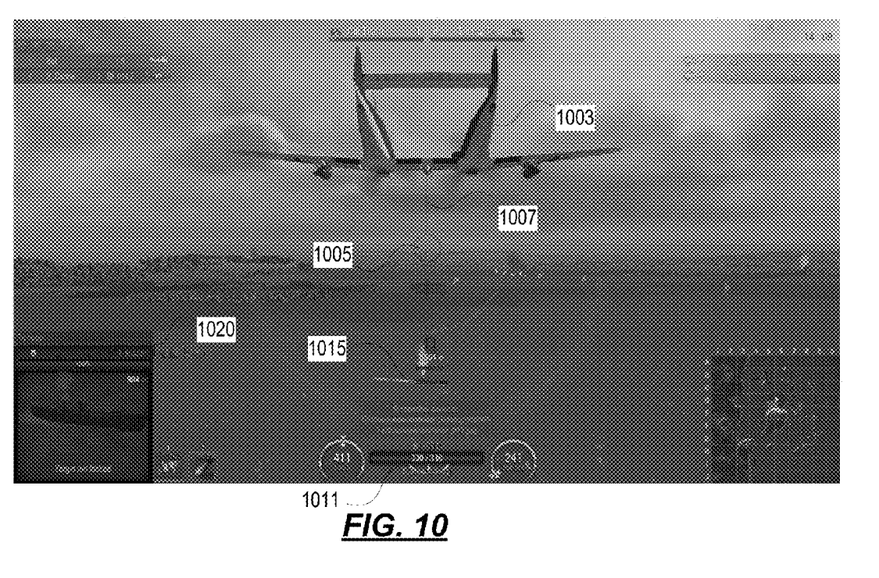
Figure 11:
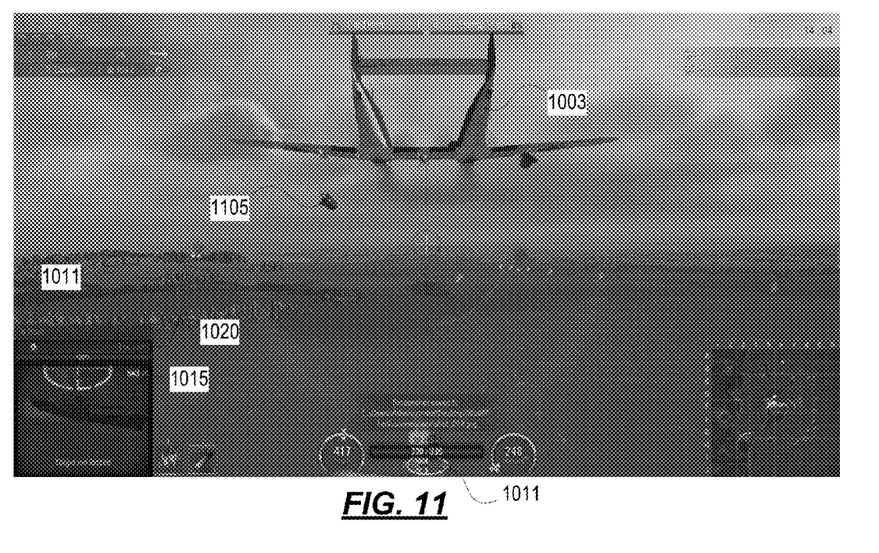

With further reference to FIG. 10, when in assault sub mode, in addition to the reticle 1005 and direction indicator 1007, control logic may further cause to be displayed a bombing target indicator 1011. In some embodiments, target indicator 1011 may be visible in other control modes (e.g., fight sub-mode) as well. In some embodiments, target indicator 1011 may be available anytime the vehicle being controlled by the user has at least one available bomb or other vertically delivered weapon that can be fired upon an enemy. FIG. 11 depicts a camera view after a user switches to an assault sub-mode. In assault sub-mode, the camera view remains behind vehicle 1003, but is depicted from underneath vehicle 1003 in order to provide visibility to the surface below vehicle 1003. As shown in FIG. 10, vehicle 1003 is heading toward a ground-based target 1015 which, because the target is in the immediate flight path of vehicle 1003, may be depicted zoomed-in in assault target window 1020.

Figure 12:
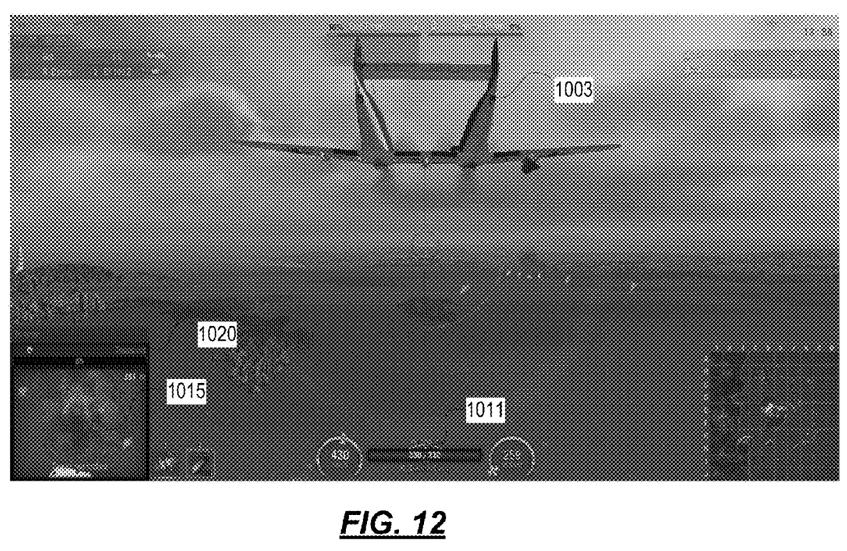

With reference to FIG. 11, when the indicator 1011 appears on target 1015 (e.g., in the main view and/or in target window 1020), the user may provide predetermined input to drop bomb 1105. As shown in FIG. 12, target window 1020 may remain fixed on target 1015 even as vehicle 1003 continues flying away from target 1015 after dropping bomb 1105. As depicted in FIG. 12, target window 1020 depicts an explosion as bomb 1105 hits target 1015, resulting from the user's accuracy in timing the bomb release to coincide when target indicator 1011 previously was superimposed over target 1015.

Different extremes of maneuvers may be possible in each sub-mode. While in fight sub-mode, unlike assault sub-mode, all vehicle maneuvers may be possible, e.g., including loops, barrel rolls, and the like. In addition, a reversal from the top or the bottom of a loop may also be possible. When the user enters a new heading indicating a large deviation of heading towards the ground (toward the bottom of the screen when in straight and level flight) leads the aircraft to go down with a flip (also called split). Roll may be selected automatically in order to maintain direction as needed.

Figure 13:
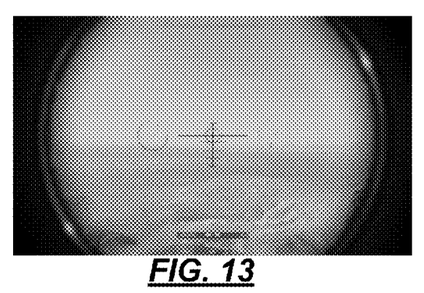
Figure 14:
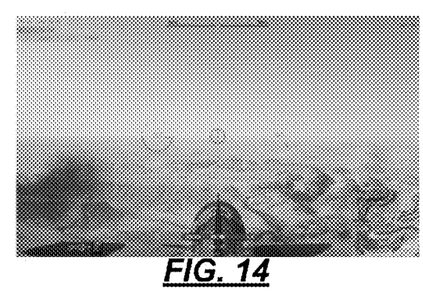
Figure 15:
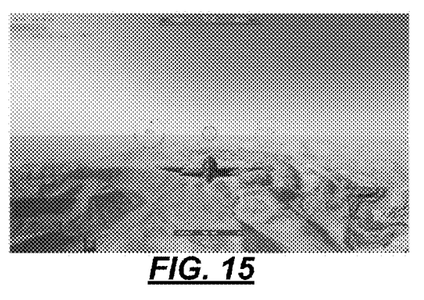
Figure 16:
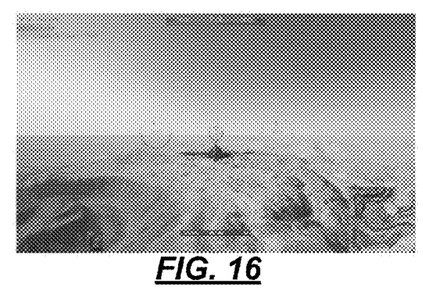

In addition, in the various control modes, a user may select from different camera positions, based on function. The user may input predetermined input using keyboard, mouse, joystick, or the like, to switch camera views. For example, a user may select sniper view (FIG. 13) that shows a zoomed-in or closeup view with a very limited field of view. Alternatively, a user may select a cockpit view (FIG. 14) for a slightly wider field of view than sniper view, but with less zoom factor applied. A default view (FIG. 3) may place the camera slightly behind and above the vehicle, providing approximately a 90-degree viewing angle. A mid-distance view (FIG. 15) and far distance view (FIG. 16) may provide varying degrees of view from increasingly further back camera angles, as desired by the user, up to a maximum of about 150 degrees of view in the far distance view (FIG. 16).

Figure 17:
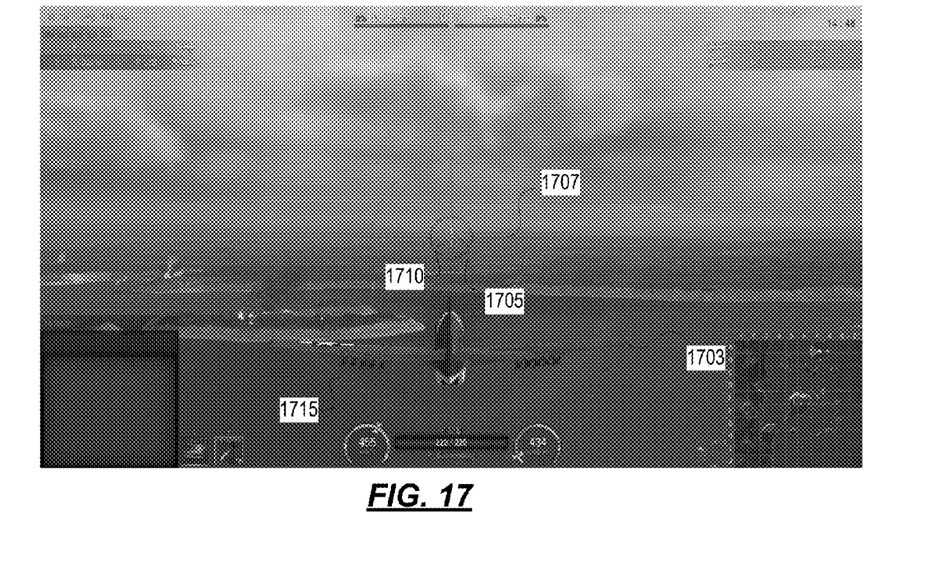

According to a second aspect, a user may switch (e.g., by providing predetermined input) to an immediate control mode. By way of introduction, immediate control mode allows a user more precise control of a vehicle by allowing a user to input a desired direction relative to a current heading and a level of aggressiveness with which the directional move should be performed. While in immediate control mode, as shown in FIG. 17, airplane 1703 may, by default, start a game session in straight and level flight. Reticle 1705 and indicator 1707 may be fixed in place with one another, appearing as a single reticle. When user provides mouse input, control indicator 1710 may move based on the mouse input to provide visual feedback regarding a direction and aggressiveness with which a maneuver is desired. The farther the user moves indicator 1710 from reticle 1705, the faster or more aggressively a turn is effected by control logic 125. If the use moves control indicator 1710 to an edge of a maximum control area 1715, then the plane may perform a continuous turn in the desired direction until the user moves the indicator 1710 back inside circle 1715. The airplane may also rotate with a maximum angle speed while indicator 1710 is at the border of circle 1715.

Figure 18:
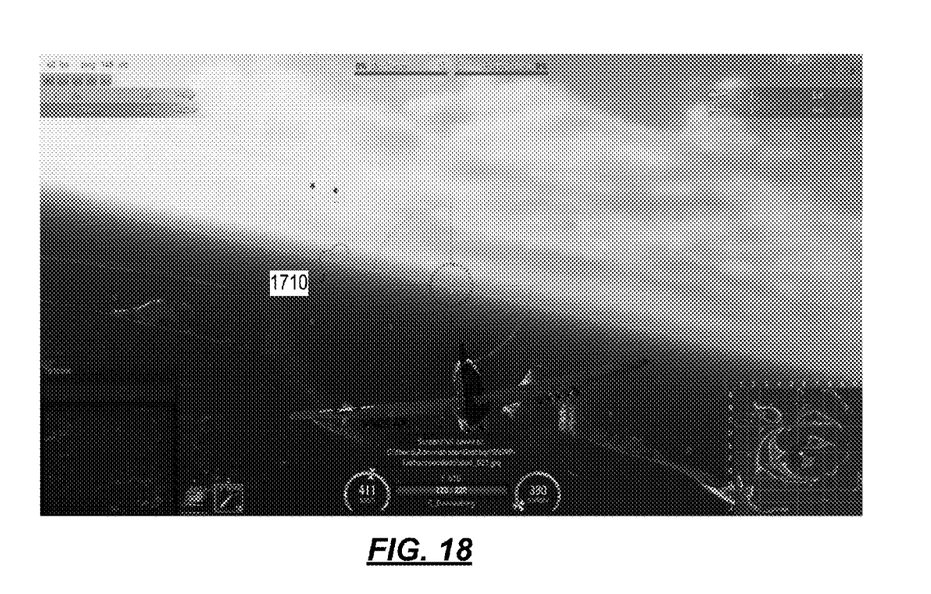

FIG. 18 shows a camera view of immediate control mode where the user has moved the mouse to the left, indicating a desire to bank the plane to the left. Indicator 1710 does not indicate a desired destination, but rather an amount of control input to apply to the airplane control systems and surfaces. Left alone, indicator 1710 will slowly return to reticle 1705 as the plane naturally returns to straight and level flight in accordance with its flight characteristics modeled using real-world physics. However, the ultimate heading obtained as a result will differ from the initial location of indicator 1710 selected by the user.

Figure 19:
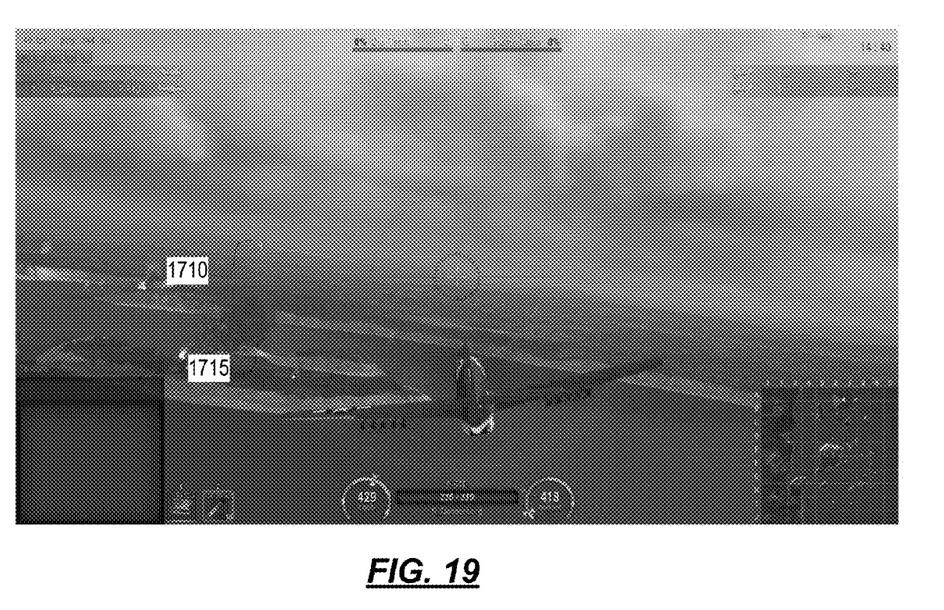

FIG. 19 shows a camera view where the user has moved indicator 1710 to the edge of maximum control ring 1715. Indicator 1710 provides visual feedback in the form of an arrow, indicating the user has reached the edge of the immediate control area, and further indicating that the airplane will continue to be controlled in the indicated direction, in perpetuity, until the user moves indicator 1710 back within circle 1715 using the mouse or other two dimensional input device. Further immediate control techniques are discussed (as "direction based control") in patent application Ser. No. 13/645,882, entitled "Using Input from a Mouse Device to Control a Video Game Vehicle," filed Oct. 5, 2012, and herein incorporated by reference.

As shown in FIGS. 17-19, indicator 1710 may be connected to reticle 1705 by a straight line "thread" to provide further visual feedback to the user regarding direction and level of aggressiveness for a maneuver to be performed. The length of the thread may determine the rotational speed of the airplane, where a longer thread may result in greater rotational speed than shorter thread lengths. Using immediate control mode, the user may set the yaw and pitch using a two dimensional input device, and the system may automatically adjust the roll based on the desired yaw and pitch, and/or based on the indicator 1710. The sum of the three planes of rotation yields the resultant plane rotation around the global axis.

The graphically simulated virtual environment is not limited to mouse control schemes only. Other devices, such as joysticks, gamepads, etc., may also be supported. The implemented physics (flight model) may be used to ensure equal treatment for any supported device so that there is equal and unanimous interpretation of any provided user input to control a vehicle.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. One or more non-transitory computer readable media storing computer readable instructions that, when executed, cause a system to perform:
    graphically rendering a virtual environment for output to a display device;
    simulating a vehicle within the virtual environment;

while maintaining the vehicle in a first directional heading, receiving user input identifying a second directional heading;
pivoting a camera angle about the vehicle to the second directional heading;
causing the vehicle to alter course from the first directional heading to the second directional heading; and
maintaining the camera angle at the second directional heading while graphically rendering rotation of the vehicle as the vehicle alters course to the second directional heading.

2. The computer readable media of claim 1, wherein causing the vehicle to alter course comprises:
determining one or more inputs to apply to one or more corresponding control systems of the vehicle to yield the second directional heading;
applying the determined one or more inputs to the one or more corresponding control systems; and
using a physics engine to determine a resultant effect of the inputs on each corresponding control system.

3. The computer readable media of claim 2, wherein the one or more control systems comprise flaps and ailerons.

4. The computer readable media of claim 2, wherein the one or more control systems comprises an engine power of the vehicle.

5. computer readable media of claim 1, wherein the instructions further cause the system to perform:
providing a first vehicular control sub-mode, wherein a default camera angle of the first vehicular control sub-mode provides a view from behind and above the vehicle being controlled, wherein the first vehicular control sub-mode provides a first targeting reticle associated with a first weapon attached to the vehicle; and
providing a second vehicular control sub-mode, wherein a default camera angle of the second vehicular control sub-mode provides a view from behind and below the vehicle being controlled, and wherein the second vehicular control sub-mode provides the first targeting reticle associated with the first weapon attached to the vehicle, and concurrently provides a second targeting reticle associated with a second weapon attached to the vehicle.

6. The computer readable media of claim 5, wherein the vehicle is an airplane, the first weapon is an air-to-air weapon, and the second weapon is an air-to-ground weapon.

7. The computer readable media of claim 5, wherein the instructions further cause the system to perform:
when in the second vehicular sub-mode, maintaining a target window on a ground-based target after deployment by the vehicle of an air-to-ground weapon until the air-to-ground weapon hits the target or the ground in the virtual environment.

8. A method comprising:
graphically rendering, by a computing device, a virtual environment for output to a display screen;
simulating a vehicle within the virtual environment;
while maintaining the vehicle in a first directional heading, receiving user input identifying a second directional heading;
pivoting a camera angle about the vehicle to the second directional heading;
causing the vehicle to alter course from the first directional heading to the second directional heading; and
maintaining the camera angle at the second directional heading while graphically rendering rotation of the vehicle as the vehicle alters course to the second directional heading.

9. The method of claim 8, wherein causing the vehicle to alter course comprises:
determining one or more inputs to apply to one or more corresponding control systems of the vehicle to yield the second directional heading;
applying the determined one or more inputs to the one or more corresponding control systems; and
using a physics engine to determine a resultant effect of the inputs on each corresponding control system.

10. The method of claim 9, wherein the one or more control systems comprise flaps and ailerons.

11. The method of claim 9, wherein the one or more control systems comprises an engine power of the vehicle.

12. The method of claim 8, further comprising:
providing a first vehicular control sub-mode, wherein a default camera angle of the first vehicular control sub-mode provides a view from behind and above the vehicle being controlled, wherein the first vehicular control sub-mode provides a first targeting reticle associated with a first weapon attached to the vehicle; and
providing a second vehicular control sub-mode, wherein a default camera angle of the second vehicular control sub-mode provides a view from behind and below the vehicle being controlled, and wherein the second vehicular control sub-mode provides the first targeting reticle associated with the first weapon attached to the vehicle, and concurrently provides a second targeting reticle associated with a second weapon attached to the vehicle.

13. The method of claim 12, wherein the vehicle is an airplane, the first weapon is an air-to-air weapon, and the second weapon is an air-to-ground weapon.

14. The method of claim 12, further comprising:
when in the second vehicular sub-mode, maintaining a target window on a ground-based target after deployment by the vehicle of an air-to-ground weapon until the air-to-ground weapon hits the target or the ground in the virtual environment.

15. An apparatus, comprising:
a processor; and
memory storing computer readable instructions that, when executed by the processor, configure the apparatus to perform:
graphically rendering a virtual environment;
simulating a vehicle within the virtual environment;
while maintaining the vehicle in a first directional heading, receiving user input identifying a second directional heading;
pivoting a camera angle about the vehicle to the second directional heading;
causing the vehicle to alter course from the first directional heading to the second directional heading; and
maintaining the camera angle at the second directional heading while graphically rendering rotation of the vehicle as the vehicle alters course to the second directional heading.

16. The apparatus of claim 15, wherein causing the vehicle to alter course comprises:
determining one or more inputs to apply to one or more corresponding control systems of the vehicle to yield the second directional heading;
applying the determined one or more inputs to the one or more corresponding control systems; and
using a physics engine to determine a resultant effect of the inputs on each corresponding control system.

17. The apparatus of claim 16, wherein the one or more control systems comprise flaps and ailerons.

18. The apparatus of claim 16, wherein the one or more control systems comprises an engine power of the vehicle.

19. The apparatus of claim 15, wherein the instructions further cause the apparatus to perform:

providing a first vehicular control sub-mode, wherein a default camera angle of the first vehicular control sub-mode provides a view from behind and above the vehicle being controlled, wherein the first vehicular control sub-mode provides at least a first targeting reticle associated with a first weapon attached to the vehicle; and     providing a second vehicular control sub-mode, wherein a default camera angle of the second vehicular control sub-mode provides a view from behind and below the vehicle being controlled, and wherein the second vehicular control sub-mode provides the first targeting reticle associated with the first weapon attached to the vehicle, and concurrently provides a second targeting reticle associated with a second weapon attached to the vehicle.

20. The apparatus of claim 19, wherein the vehicle is an airplane, the first weapon is an air-to-air weapon, and the second weapon is an air-to-ground weapon.

21. The apparatus of claim 19, wherein the instructions further cause the apparatus to perform:

when in the second vehicular sub-mode, maintaining a target window on a ground-based target after deployment by the vehicle of an air-to-ground weapon until the air-to-ground weapon hits the target or the ground in the virtual environment.

\* \* \* \* \*